Figure 1:
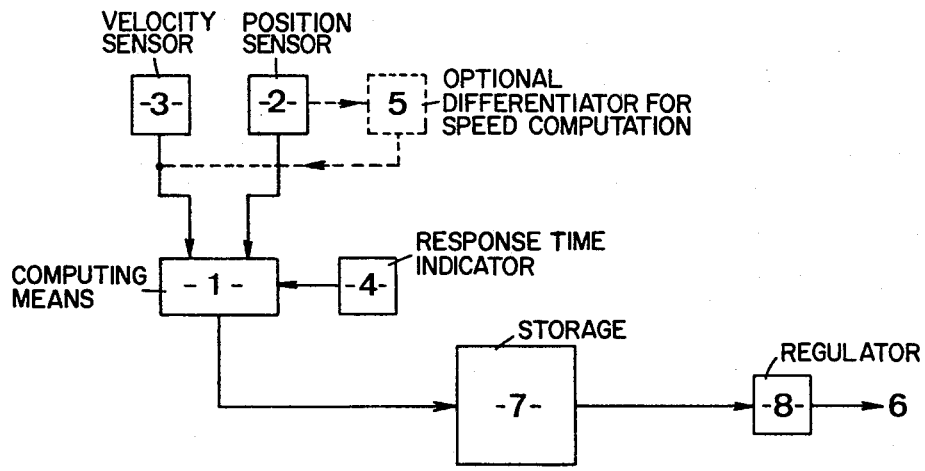

United States Patent [19]

Virnot et al.

[11] 4,066,877
[45] Jan. 3, 1978

[54] PROCEDURE AND SYSTEM FOR DRIVING A VEHICLE

[75] Inventors: Alain D. Virnot; Simon A. Cynober, both of Paris, France

[73] Assignee: Jeumont-Schneider, Puteaux, France

[21] Appl. No.: 678,649

[22] Filed: Apr. 20, 1976

[30] Foreign Application Priority Data

Apr. 29, 1975 France .................. 75.13327

[51] Int. Cl.² ............... G06F 15/50; B60K 31/00
[52] U.S. Cl. .................. 364/426; 180/77 R; 246/174; 246/182 C; 340/53
[58] Field of Search ............ 180/77 R; 235/150.2, 235/150.24; 340/53-55; 246/167 R, 174, 182 R, 182 B, 187 R

[56] References Cited

U.S. PATENT DOCUMENTS 2,990,902  7/1961  Cataldo .................. 180/79.2
3,845,289  10/1974  French .................. 235/150.2 X

OTHER PUBLICATIONS

French; R. L. et al., Automatic Route Control System, In IEEE Trans. Vehic. Tech., VT-22(2): pp. 36-41, May 1973.

*Primary Examiner*—R. Stephen Dildine, Jr.
*Attorney, Agent, or Firm*—Bacon & Thomas

[57] ABSTRACT

Procedure and system for driving a vehicle required to travel repeatedly over the same path, in which procedure at least some elements of the vehicle are operated in accordance with prerecorded information.

According to the invention, the information relates to the operations to be performed on or by such elements in relation to the position of the vehicle on its path; and the elements are operated on the basis of such information in the light of the vehicle's instantaneous position with a correction for instantaneous vehicle speed and the response time of the elements.

23 Claims, 3 Drawing Figures

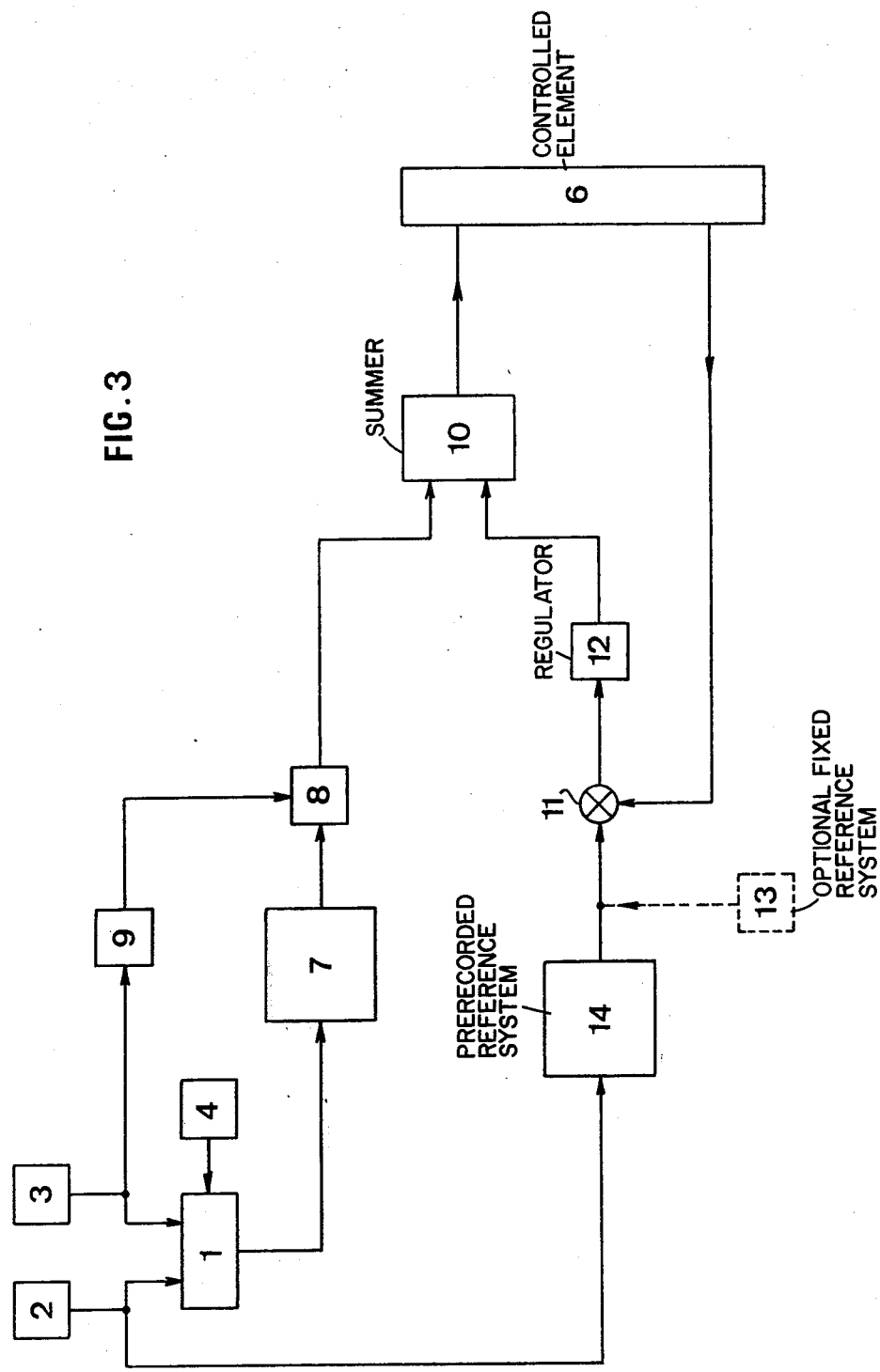

PROCEDURE AND SYSTEM FOR DRIVING A VEHICLE

This invention relates to a procedure and a system for driving a vehicle required to travel repeatedly over the same path, possibly at various speeds. The invention relates to vehicles whose path is determined by mechanical guides, e.g., rails, and by electric or radio guides or markers such as buried or immersed electric cables extending along the path, beacons etc.

Of course, when the driver of a motor vehicle travels over the same section of road repeatedly, he learns the road and gradually records unusual features thereof which may cause him to alter his path, speed and so on. He acquires road knowledge which makes him drive more rationally and smoothly and economically and/or faster. Driving improves in proportion as road knowledge is better. Repeated driving over the same route becomes a virtually mechanical operation. Also, driving is better in proportion as the driver sees further ahead — i.e., becomes aware sooner of disturbing incidences on his route.

On the other hand, for instance, a train which keeps on making the same journey is driven on each journey as if it was making the trip for the first time; consequently, trains, although less dependable and more reliable than motor vehicles, are considerably inferior to the latter in their performances.

It is an object of this invention to obviate this disadvantage.

According to the invention, therefore, in a procedure for driving a vehicle required to travel repeatedly over the same path, in which procedure at least some elements of the vehicle are operated in accordance with pre-recorded information, the information relates to the operations to be performed on or by such elements in relation to the position of the vehicle on his path, and the elements are operated on the basis of such information in the light of the vehicle's instantaneous position with a correction for instantaneous vehicle speed and the response time of the elements. The vehicle elements can therefore start to be operated in advance to ensure optimum operation at the right time when the vehicle is at the corresponding place. Clearly, therefore, the pre-recorded information contents ensure that the vehicle is driven on the basis of acquired habits, and the use made of such information enables the vehicle to be driven on a basis of anticipation.

The recorded information can result from a recording made either in a first journey in normal driving conditions or in a laboratory, having due regard to the listed items of the trip or path.

Of course, the operated elements can be of various kinds, such as rams or motors or valves or the like, which can control axle orientation, vehicle body tilt, suspension compression and so on. The driving and/or comfort of the vehicle can therefore be optimized by communicating to such elements the conditions and/or the optimum position to be taken up throughout the journey.

Advantageously, the amplitude and speed of operation of some elements can depend upon instantaneous vehicle speed; for instance, vehicle body tilt on a curve to offset centrifugal force is preferably calculated in dependence upon vehicle speed.

In the procedure according to the invention, therefore, the vehicle elements "know" what they have to do throughout the journey. Advantageously, they are also given an indication, in the form of a reference value, of the result they must reach throughout the journey. The reference value can be fixed; however, according to another feature of the procedure according to the invention, the pre-recorded information relates not only to the operations to be performed on the elements but also to the results to be achieved thereby in relation to the position of the vehicle on its path. Consequently, not only does the vehicle "know" what is has to do in dependence upon what is going to happen to it but also its control cannot drift. Driving can therefore become completely automatic.

A system for using the procedure according to the invention can comprise: a store containing information about the actions to be performed on at least one element related to the position of the vehicle on its route; first means for supplying the instantaneous position of the vehicle; second means for supplying the instantaneous position of the vehicle, third means for supplying particulars of the response time of the element to be controlled: a computer receiving the output signals of the three means and outputting an anticipated vehicle position; means for reading the store at the anticipated vehicle position; and means for regulating such element and receiving the output from the store corresponding to such anticipated position.

The system can comprise a second computer which receives the output signal of the second means and which provides the regulator with a reference signal for operating the element in dependence upon the nature of the action.

Between the regulator and the element operated thereby there is a summer, one of whose inputs receives the regulator output signal and the other of whose inputs receives the output signal of a second regulator disposed in a control loop for the operation of the element controlled by the first regulator. Preferably, the reference signal supplied to the loop comes from a second store containing pre-recorded information about the results to be provided by the regulated element in relation to the position of the vehicle on the path.

Figure 2:
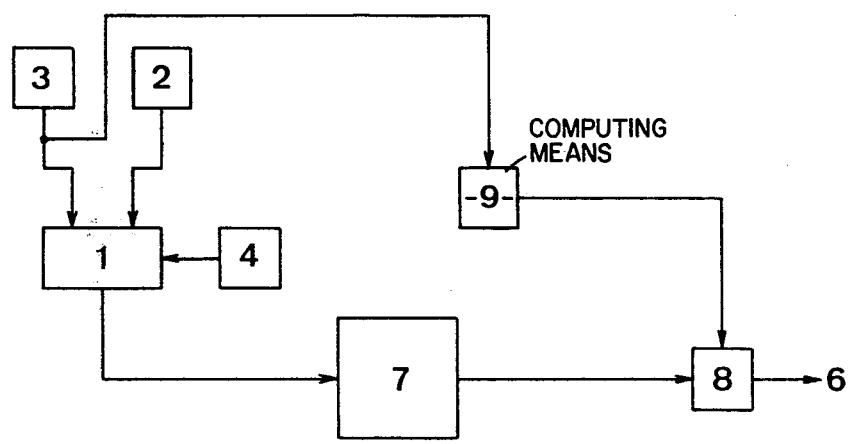

The accompanying drawings will make clearly apparent how the invention can be carried into effect. In the drawings:

FIGS. 1 to 3 are block schematic diagrams of three embodiments of the system according to the invention.

Like references denote like elements throughout the drawings.

The system according to the invention as shown diagrammatically in FIG. 1 is fitted to a vehicle (not shown) which repeatedly makes the same journey. The system comprises a computer 1 simultaneously receiving signals from a position sensor 2, a speed sensor 3 and a response time indicator 4. Sensor 2 indicates the instantaneous position of the vehicle, e.g. its abscissa $x$ on the vehicle path. Sensor 3 delivers the instantaneous vehicle speed V. It would be possible for the speed V to be calculated from $x$ by means of a differentiator 5. Indicator 4 delivers a time T corresponding, with allowance for adjustments, to the response time of the control channel of a final control element 6.

Computer 1 computes an abscissa $x'$ such that:

$$x' = x + V.T.$$

i.e., $x'$ leads on $x$ by the amount $VT$.

Computer 1 transmits its signal $x'$ to a store 7 containing a table of the actions to be performed by element 6 in dependence upon the abscissae $x$; store 7 provides a regulator 8 with the action corresponding to the abscissa $x'$, whereafter regulator 8 operates the final control element 6.

Consequently, while the vehicle is still at the abscissa $x$, the final control element 6 receives the instruction which it will have to implement when the vehicle is at position $x'$. Actuation of the final control element 6 is therefore anticipated by the distance VT or, if the speed V remains constant between the positions $x$ and $x'$, by the time T.

If the final control element 6 is required to be operated in a manner dependent upon the instantaneous vehicle speed V, the system according to the invention also comprises (see FIG. 2) a computer 9 which receives the signal V from sensor 3 and which supplies the regulator 8 e.g. with a signal $V^k$ to operate the final control element 6 in dependence upon a power of V. The factor $k$ can have values which depend upon the kind of operation provided by the elements 6; for instance, if the same control vehicle body inclination to allow for track superelevation and centrifugal force on curves, the factor K can be 2.

The systems shown in FIGS. 1 and 2 are appropriate for operations performed against the force of resilient means or as far as a fixed abutment etc. The amplitude of the operations is determined by an element external to the systems.

FIG. 3 shows a system according to the invention wherein the amplitude of the operation of the elements 6 can be controlled. To this end, the system, which comprises the elements 1-9 hereinbefore described, further comprises a summer 10 having one input connected to the output of regulator 8 and having its output connected to the input of the final control element 6. The same also forms part of a control loop comprising a comparator 11 and a second regulator 12. Comparator 11 receives the output signal of element 6 and a reference signal provided either by a fixed reference system 13 or, preferably, a prerecorded-reference system 14. The output signal of comparator 11 is applied to the second regulator 12 whose output is connected to the other input of summer 10.

The prerecorded-reference system 14 comprises a store in which a characteristic value of the result of the operation of element 6 corresponds to each value of $x$. Such information plus the information of store 7 can be derived from a registration made in a previous trip over the same path. Of course the stores 7, 14 can be embodied by the same store or by parts of the same store. Store 14 is read in dependence upon the indication $x$ given by the position sensor 2 and delivers at its output the result of the corresponding action.

We claim:

1. A driverless method for operating a vehicle along a path comprising the steps of:
    a. storing information pertaining to operation of several elements of the vehicle in relation to the vehicle's position on the path;
    b. sensing data related to the vehicle's position along the path,
    c. automatically operating one of said elements responsive to the sensed data and to the stored information, and
    d. correcting said operating step in accordance with vehicle speed and response time of said elements.

2. The method recited in claim 1 further comprising the step of sensing data pertaining to the vehicle's velocity along the path.

3. The method recited in claim 1 further comprising the steps of:
    a. computing a leading position of the vehicle, and
    b. operating an element of the vehicle responsive to the computed lead position, thereby compensating for the response time of the element.

4. The method recited in claim 3 wherein said computing step comprises calculating the leading position using velocity data and the sensed position data.

5. The method recited in claim 4 wherein said velocity data is obtained by the step of differentiating the sensed position data.

6. The method recited in claim 4 further comprising the step of regulating the operating step of the elements.

7. The method recited in claim 6 wherein said regulating step is responsive to an exponential computation of the velocity data.

8. The method recited in claim 7 wherein said sensing step further comprises the step of sensing data pertaining to the vehicles's velocity along the path.

9. The method recited in claim 3 wherein said storing step further includes the step of storing information pertaining to results to be achieved by the operation of the vehicle elements in relation to the vehicle's position along the path.

10. The method recited in claim 1 wherein said storing step comprises a recording step.

11. The method recited in claim 10 wherein said recording step occurs during a previous travel along the path.

12. The method recited in claim 10 wherein said recording step occurs in a laboratory.

13. An automated, driverless system for operating elements of a vehicle comprising:
    a. position sensing means providing a signal representing the vehicle's position along a path;
    b. computing means receiving said position signal for calculating an anticipated vehicle position;
    c. storage means receiving said anticipated vehicle position from said computing means, said storage means containing information pertaining to actions to be taken by an element related to the anticipated position of a vehicle; and
    d. means for regulating such an element responsive to information obtained from said storage means.

14. A driving system as recited in claim 13 further comprising means for providing said computing means with a signal representative of reaction time of an element being regulated.

15. An automated system for operating elements of a vehicle comprising:
    a. position sensing means providing a signal representing the vehicle's position along a path;
    b. computing means for calculating an anticipated vehicle position;
    c. storage means receiving said anticipated vehicle position from said computing means, said storage means containing information pertaining to actions to be taken by an element related to the anticipated position of the vehicle;
    d. means for providing a signal representative of reaction time of an element being regulated;
    e. said computing means receiving said position signal and said reaction time signal; and f. means for regulating such an element responsive to information obtained from said storage means.

16. A driving system as recited in claim 15 wherein said computing means includes receiving means for receiving velocity data for calculating said anticipated vehicle position.

17. A driving system as recited in claim 16 further comprising velocity sensing means providing velocity data to said computing means.

18. A driving system as recited in claim 16 further comprising differentiating means for differentiating said position signal and for providing velocity data to said computing means.

19. A driving system as recited in claim 16 further comprising velocity sensing means providing velocity data to said computing means.

20. A driving system as recited in claim 19 further comprising second computing means receiving said velocity data from said velocity sensing means and providing a reference signal to said regulating means.

21. A driving system as recited in claim 20 further comprising:

a. summing means interposed between said regulating means and the element regulated thereby, said summing means having two inputs and an output;
b. controlling means for operating the element controlled by said regulator, said controlling means comprising a loop including therein:
 comparing means,
 second regulating means,
 said summing means and
 the element regulated thereby;
c. said summing means receiving on its inputs signals generated by said regulating means and by said second regulating means and connected at its output to the element controlled thereby.

22. A driving system as recited in claim 21 further comprising second storing means receiving an input from said velocity sensing means for providing a signal representing values of results of operation of the element being controlled to said comparing means.

23. A driving system as recited in claim 22 further comprising a fixed reference system providing a reference signal to said comparing means.

* * * * *